United States Patent
Kunimatsu et al.

(10) Patent No.: US 6,198,475 B1
(45) Date of Patent: Mar. 6, 2001

(54) TOUCH OPERATION INFORMATION OUTPUT DEVICE

(75) Inventors: Yoshimasa Kunimatsu; Minoru Morikawa; Satoshi Mori; Chikao Nagasaka; Masato Nishikawa, all of Niwa-gun (JP)

(73) Assignee: Kabushiki Kaisha Tokai-Rika-Denki-Seisakusho, Niwa-gun (JP)

( * ) Notice: Subject to any disclaimer, the term of this patent is extended or adjusted under 35 U.S.C. 154(b) by 0 days.

(21) Appl. No.: 09/102,904

(22) Filed: Jun. 23, 1998

(30) Foreign Application Priority Data

Jun. 26, 1997 (JP) .................................................. 9-170088

(51) Int. Cl.⁷ ..................................................... G09G 5/00
(52) U.S. Cl. ........................... 345/173; 345/168; 345/172; 345/175; 341/21; 341/22; 341/24; 341/25
(58) Field of Search .................................... 345/173, 175, 345/172, 168, 22, 21, 24, 25; 341/22, 21, 24; 241/25

(56) References Cited

U.S. PATENT DOCUMENTS

| 4,037,200 | * | 7/1977 | Crammer | 340/166 |
| 4,985,692 | * | 1/1991 | Breider et al. | 340/407 |
| 5,376,948 | * | 12/1994 | Roberts | 345/173 |
| 5,412,189 | * | 5/1995 | Cragun | 235/379 |
| 5,926,119 | * | 7/1999 | Lindeman et al. | 341/22 |

FOREIGN PATENT DOCUMENTS 9-91486   9/1995   (JP) .

* cited by examiner

Primary Examiner—Richard A. Hjerpe
Assistant Examiner—Jean Lesperance
(74) Attorney, Agent, or Firm—Oliff & Berridge, PLC

(57) ABSTRACT

A touch operation information output apparatus is provided in a position at which a driver can operate it, and detects a touched position with respect to the input pad and outputs its coordinate data to the display device. Here, protruding brackets are provided at 16 positions on the input pad. A first group of protruding brackets that are in 4 positions at a center of the input pad are formed in a "+" shape, a second group of protruding brackets that are in four corners of the input pad are formed in an "L" shape and a third group of protruding brackets are formed in a "T" shape. Because of this, the driver can recognize the touched position with respect to the touch operation information output apparatus and blind operation becomes possible.

12 Claims, 9 Drawing Sheets

TOUCH OPERATION INFORMATION OUTPUT DEVICE

INCORPORATION BY REFERENCE

The disclosure of Japanese Patent Application No. HEI 9-170088 filed on Jun. 26, 1997 the specification, drawings and abstract is incorporated herein by reference in its entirety.

BACKGROUND OF THE INVENTION

1. Field of the Invention

The present invention relates to a touch operation information output device which outputs coordinate data of a touched position on an operating surface.

2. Description of Related Art

Vehicles, for example, are provided with a conventional display device with a touch operation function. One example of this display device is constructed to detect a touched position with respect to a display screen through an optical sensor. Specifically, light projection elements and light receiving elements are arranged so as to form a plurality of parallel optical axes corresponding to a vertical direction and a horizontal direction of the display screen. Based on an optical axis extending between the light projection element and the light receiving element being severed by touching the display screen with a finger, the display device detects the center position of the touched area and outputs the coordinate data thereof.

Accordingly, when a screen for an air conditioner, for example, is displayed, the air conditioning function in the vehicle can be arbitrarily adjusted by touch-operating a button display portion which is displayed on the screen for the air conditioner. By using this type of display device with a touch operation function, switches for devices on the vehicle, such as the air conditioner, a radio and a car navigation system, can be omitted. Therefore, the instrument panel can look neat.

Incidentally, with the above-mentioned conventional display device having a touch operation function, the driver is required to touch the display device by stretching his arm, thus rendering controllability of the display device insufficient. Therefore, it has been considered to separate the touch operation function from the display device. In other words, a touch operation information output device that outputs coordinate data, which shows the finger-touched position with respect to the operating surface and also outputs the "on" data which shows that the aforementioned operating surface has been press-operated, is provided separately from the display device. The touch operation information output device is installed, for example, on the arm rest of the driver's-side door, and can improve the operability by the driver.

However, there is a disadvantage in that the finger-touched position with respect to the operating surface cannot be recognized when the driver performs the touch operation of the touch operation information output device of this type while driving.

SUMMARY OF THE INVENTION

The present invention is made based on the above-mentioned conditions, and has one purpose to provide a touch operation information output device with which the user can recognize the finger-touched position with respect to the operating surface in a structure which outputs coordinate data and shows the finger-touched position on the operating surface.

In the touch operation information output device which outputs coordinate data and shows the finger-touched position on the operating surface, the touch operation information output device of the present invention provides bumps at specified positions on the operating surface. The bumps have different shapes according to their position on the operating surface.

According to this structure, since the finger-touched position on the operating surface can be recognized by a user in accordance with the shape of the bump by touching the bumps that are formed on the operating surface by a finger, a blind operation can be speedily performed.

BRIEF DESCRIPTION OF THE DRAWINGS

The invention will be appreciated and understood from consideration of the detailed description of the invention when taken together with the accompanying drawings, in which.

DETAILED DESCRIPTION OF PREFERRED EMBODIMENTS

Hereafter, an embodiment in which the present invention is adapted to a display system for a vehicle is explained with reference to the drawings.

Figure 2:
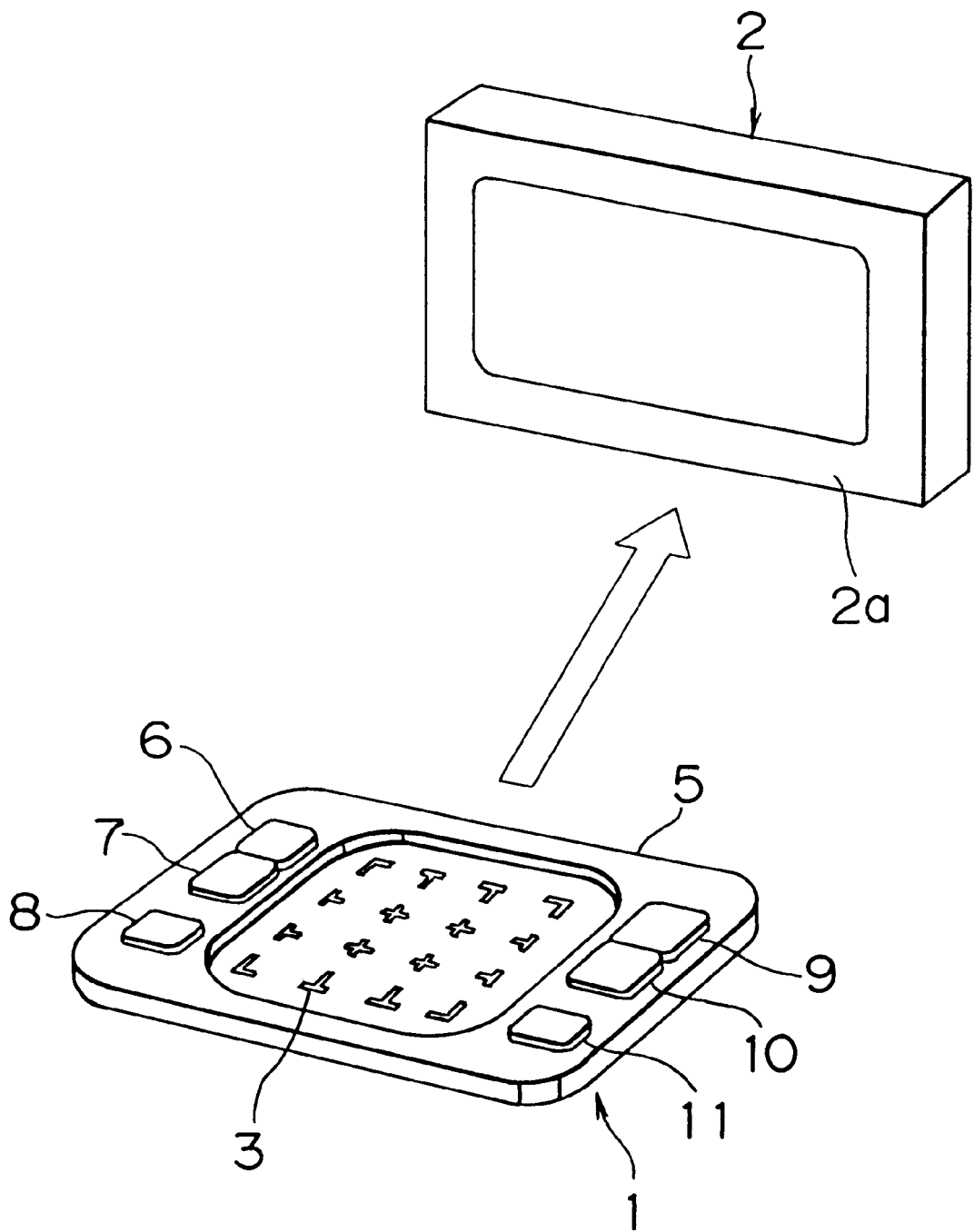
FIG. 2 is a perspective view which shows system components.

FIG. 2 shows the overall structure of the system. In FIG. 2, the touch operation information output apparatus 1 can be provided, for example, on an armrest of a driver side door of a vehicle, where a driver can easily operate it while driving the vehicle, and can output touch operation information corresponding to the touch operation.

Moreover, a display device 2 is arranged, for example, on a dashboard of the vehicle. The display device 2 includes a display mechanism 2a, of which a main component is a microcomputer (not shown in the figure) and predetermined screens can be displayed corresponding to the touch operation information from the touch operation information output apparatus 1.

Figure 1:
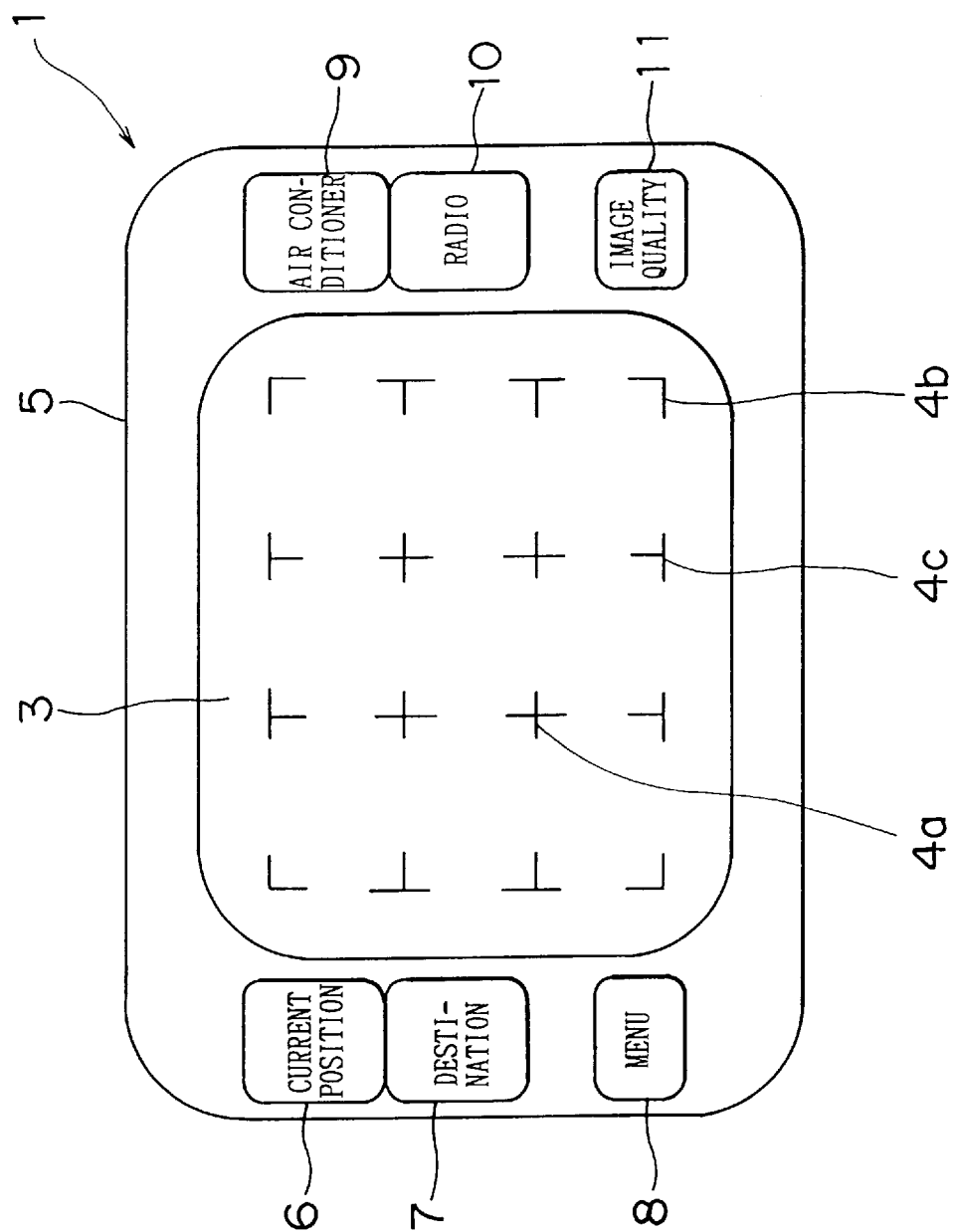
FIG. 1 is a front view of a touch operation information output apparatus of a first embodiment of the present invention.

The detailed description of the touch operation information output apparatus 1 is given. FIG. 1 shows a front view of the touch operation information output apparatus 1. In FIG. 1, a tactile surface panel in a form of an input pad 3 (50 mm×70 mm) is arranged at a center of the touch operation information output apparatus 1. The tactile surface panel includes a plurality of tactile sensing elements such as protuberances and concavities as discussed.

Here, at predetermined positions on a surface of the input pad 3, protuberances in a form of line-shaped protruding brackets or bumps 4a and 4b are formed at specified positions. These protruding brackets 4a and 4b are provided on the input pad 3 at 16 positions. The protruding brackets 4a that are at 4 positions in a center are formed in a "+" shape, the brackets 4b that are in four corners are formed in an "L" hape, and the remaining brackets 4c are formed in a "T" shape. Accordingly, since the touched position can be directly confirmed by just touching the protruding brackets 4a and 4b of the input pad 3, blind operation is possible.

Moreover, the positions of the protruding brackets 4a and 4b correspond to the positions of button display portions which are displayed on the display device 2. Buttons can be selected arbitrarily by blind operation.

Various types of mode selection buttons are arranged at positions at a periphery of the input pad 3 in a top surface of a main body 5. A current position button 6, a destination button 7, a menu button 8, an air conditioner button 9, a radio button 10 and an image quality button 11 are provided as the selection buttons.

Figure 3:
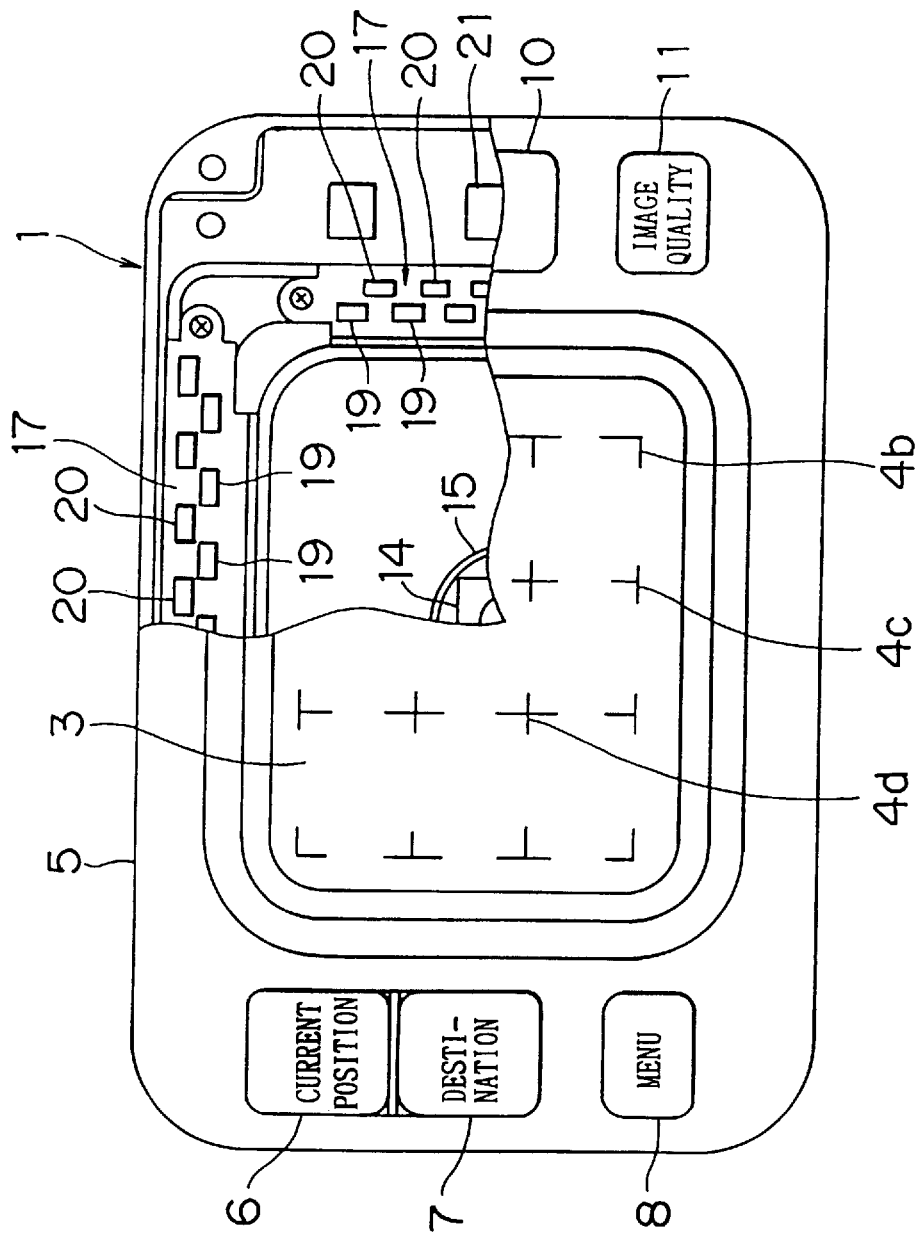
FIG. 3 is a front view which shows a cut-away of the touch operation information output apparatus.
Figure 4:
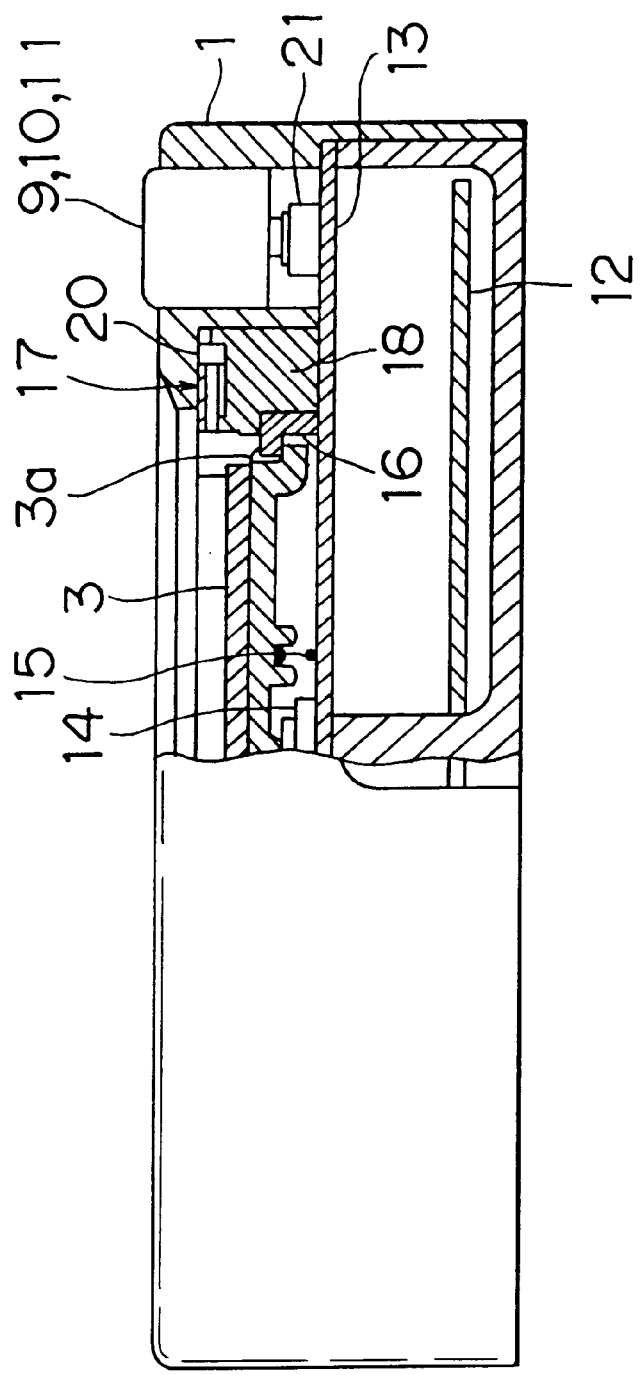
FIG. 4 is a side cross-sectional view of the touch operation information output apparatus.

FIG. 3 is a front view which shows the touch operation information output apparatus 1 partially cut away. FIG. 4 shows a cross sectional view. In FIGS. 3 and 4, a printed wiring substrate 12 is arranged at a bottom surface of the main body 5, and a printed wiring substrate 13 is arranged at a top. A touch switch 14 is installed at a center of the printed wiring substrate 13, and a compression coil spring 15 is arranged so as to surround the touch switch 14. The input pad 3 is pushed from below by the compression coil spring 15.

Here, a frame-shaped engaging member 16 is provided on the printed wiring substrate 13, and an outer periphery of the input pad 3 is engagingly stopped by a bottom surface of the engaging member 16. Moreover, a pleat-shaped packing part 3a protrudes at the outer periphery of the input pad 3, and waterproofing of an inside of the main body 5 is effected by the packing part 3a by its contact with a top surface of the engaging member 16.

Meanwhile, an optical sensor unit 17 is installed on the printed wiring substrate 13. The optical sensor unit 17 includes a plurality of LED's 19 and phototransistors 20 that are opposed and arranged on a sensor block 18 so that parallel optical axes are formed, and the LED's 19 and the phototransistors 20 are connected to the electrical circuit of the printed wiring substrate 13.

At the peripheral portion of the printed wiring substrate 13, a plurality of operation switches 21 are mounted, and the operation switches 21 turn on in response to the operation of the operation buttons 6–11.

Figure 5:
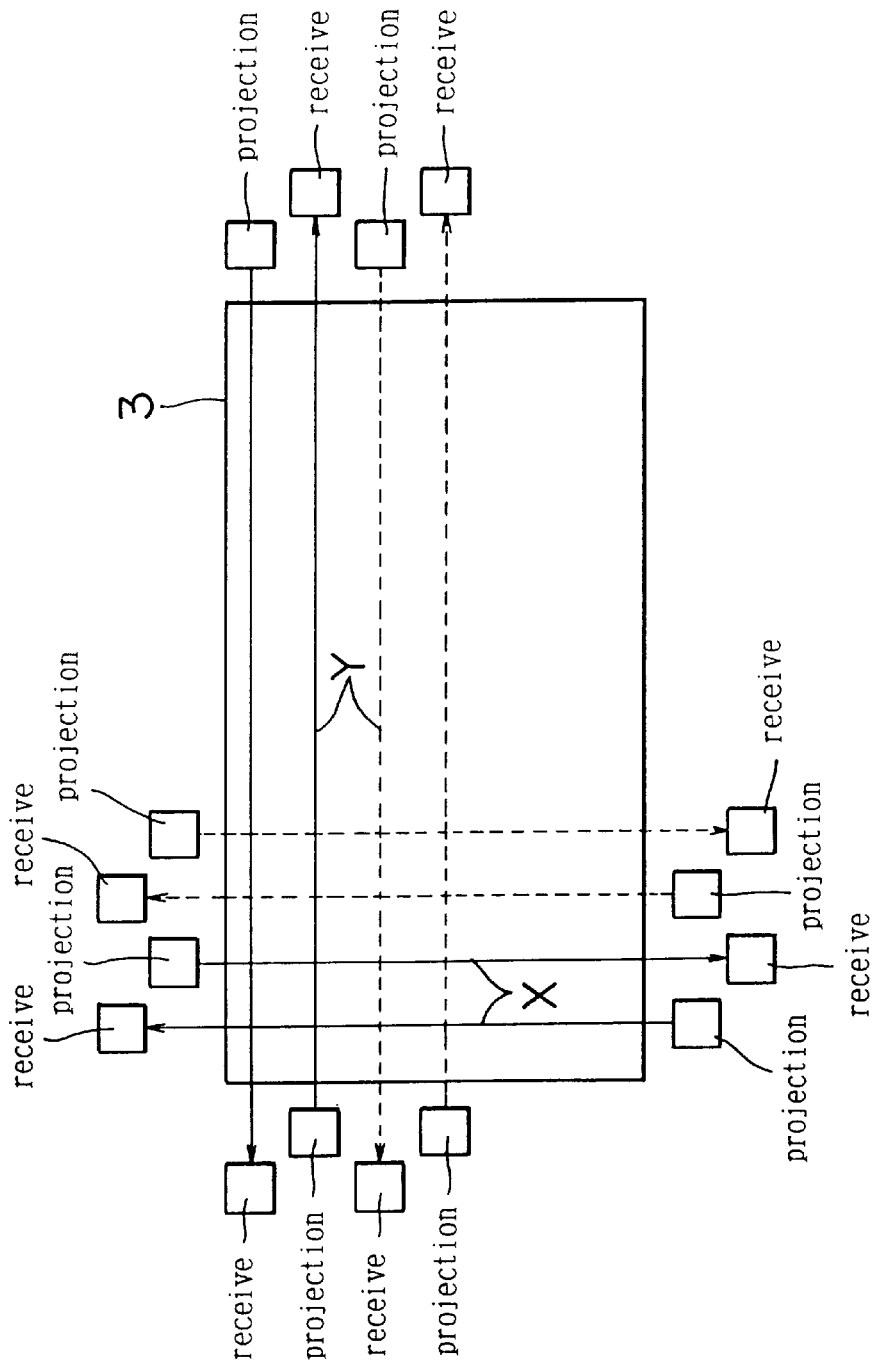
FIG. 5 shows an arrangement of LED's and a phototransistors.

FIG. 5 shows the arrangement of the LED's 19 and the phototransistors 20. In FIG. 5, 15 axes are provided as vertical direction optical axes in the figure (hereafter, X lines), and 11 axes are provided as horizontal direction optical axes (hereafter, Y lines) in the figure. In this case, the LED's 19 and the phototransistors 20 are alternately arranged in parallel in each of the X lines and the Y lines. Moreover, in the parallel-arranged LED's 19 and phototransistors 20, the phototransistors 20 are arranged behind the LED's 19. Because of this arrangement, an optical axis pitch of the X lines is decreased to 3 mm, and the optical axis pitch of the Y lines is decreased to 4 mm.

Figure 6:
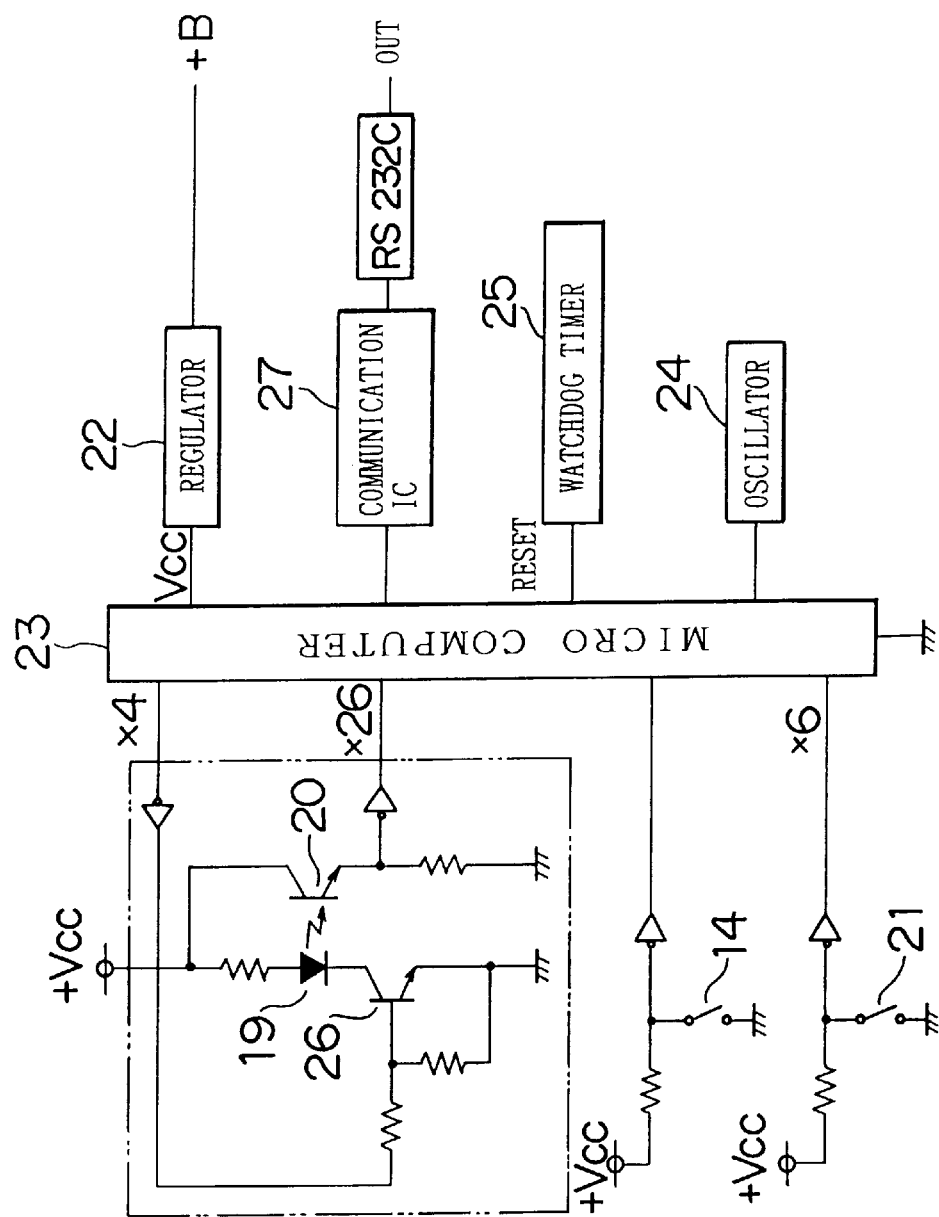
FIG. 6 is a schematic view of electrical components of the touch operation information output apparatus.

FIG. 6 shows an electrical structure of the touch operation information output apparatus 1. In FIG. 6, voltage of a battery is fed to a microcomputer 23 in a stabilized condition of a predetermined constant voltage by a regulator 22, and the microcomputer 23 is operated in accordance with a pulse signal from an oscillator 24. Moreover, a watchdog timer 25 is connected to a reset terminal of the microcomputer 23, and when the microcomputer malfunctions, it is forcibly reset by the watchdog timer 25. The microcomputer 23 is connected so as to receive the input of the on-off signals from the touch switch 14 and each operation switch 21.

Each LED 19 is connected to a transistor 26, and when current passes to the LED 19 when the transistor 26 is turned on due to the current from the microcomputer 23, the aforementioned LED 19 emits light. Moreover, the microcomputer 23 is connected to receive the input of the output voltage from each phototransistor 20.

Moreover, the microcomputer 23, based on the switches 14 and 21 and the on-off condition of the phototransistors 20, as described later, outputs on-off data of the switches and coordinate data which shows the finger-touched position with respect to the input pad 3 to a later-level circuit i.e., a circuit that comes later in sequence, via a communication IC 27. In this case, the microcomputer 23 is designed to output the data at a speed of 9600 bps in intervals of 50 ms.

Next, a display operation by the display device 2 at a time of a touch operation with respect to the input pad 3 is explained.

Figure 7:
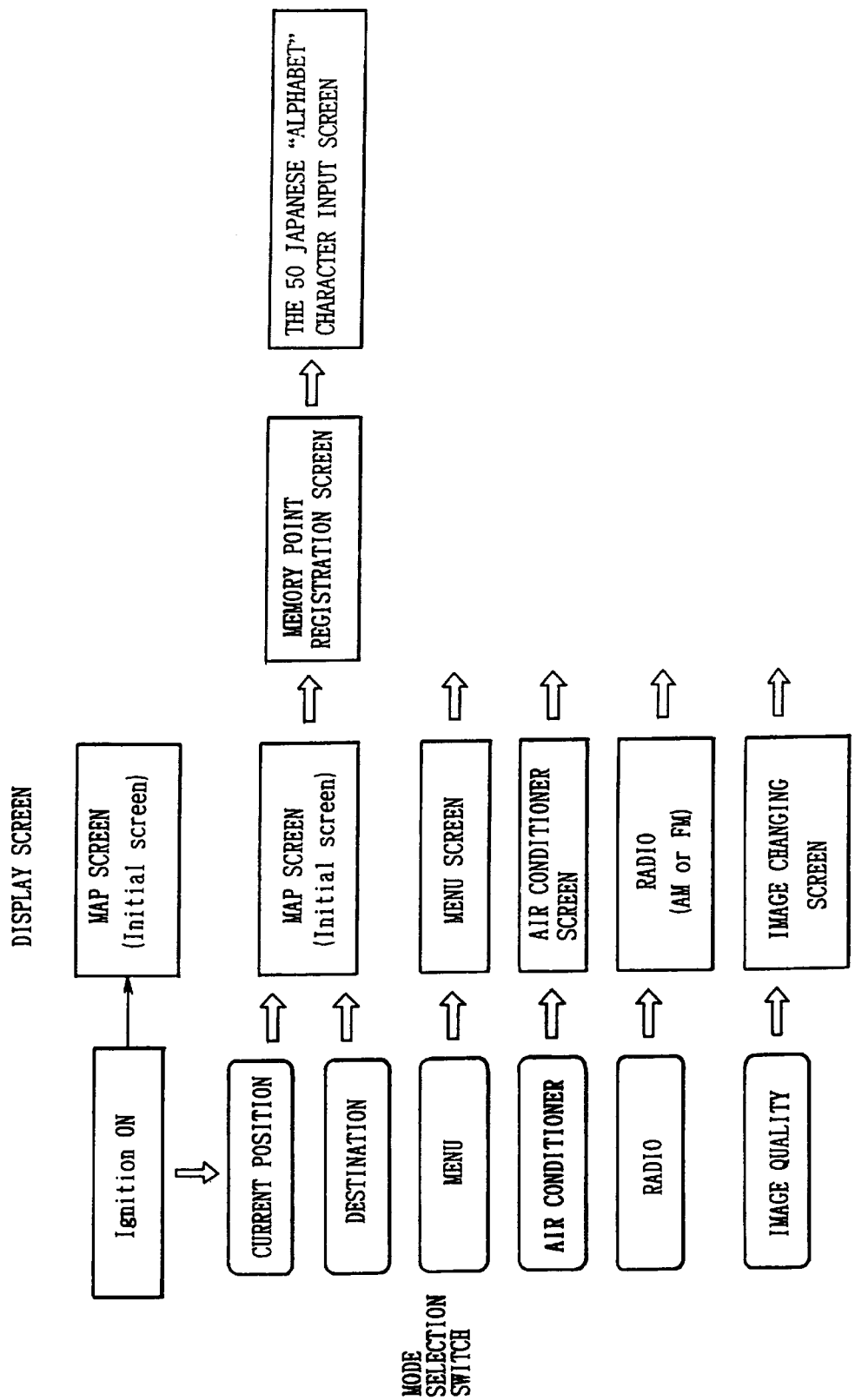
FIG. 7 is a figure which shows a display order of the display screen corresponding to the operation of the touch operation information output apparatus.
Figure 8:
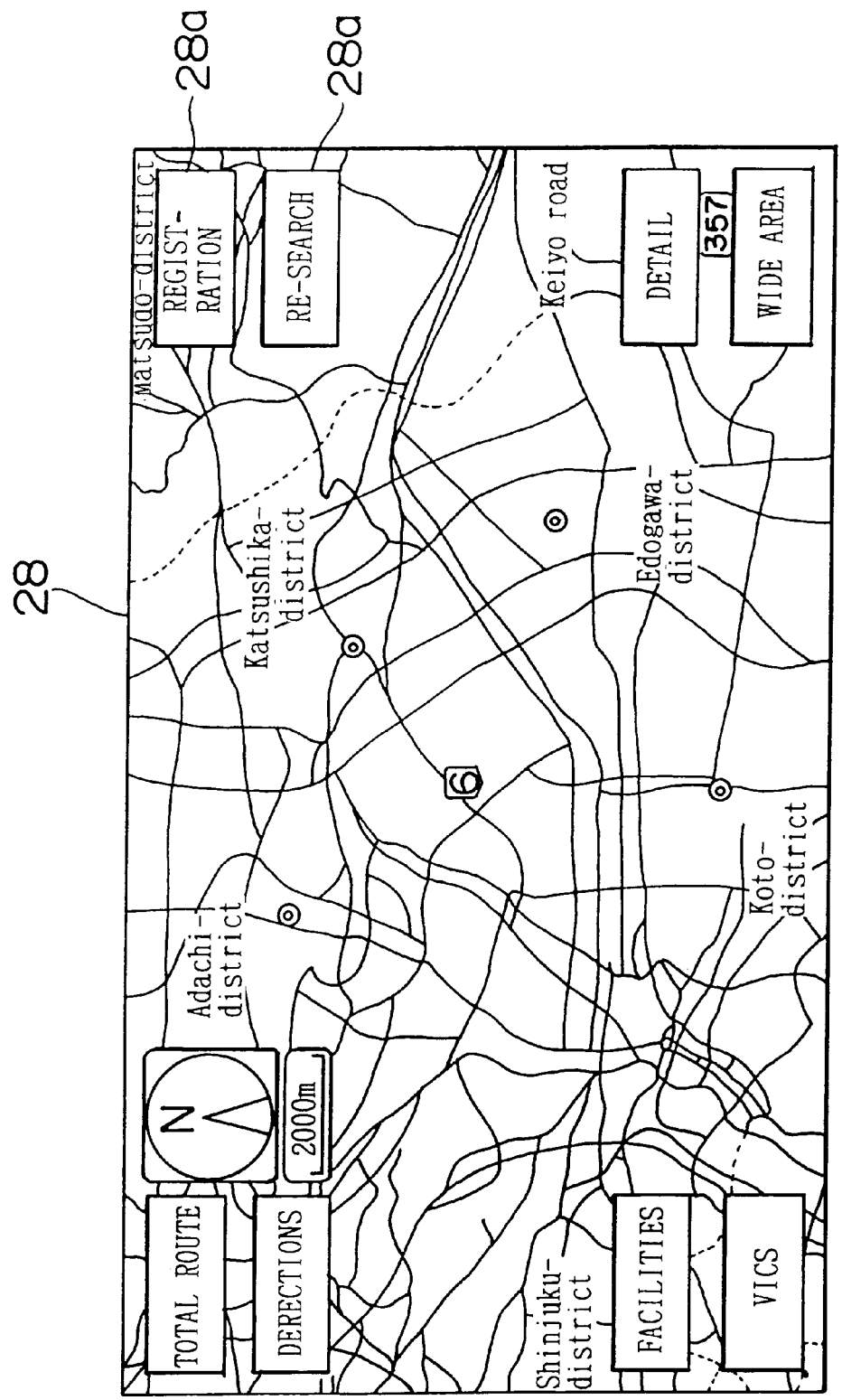
FIG. 8 is a figure which shows a map screen which is displayed on a display screen.

FIG. 7 schematically shows the display operation of the display device 2. In FIG. 7, the navigation function is operated as the initial function when the power is turned on by a starter switch. On the display device 2, a map screen 28 which shows a current geographical position, such as the example of an initial screen shown in FIG. 8, is displayed. At this time, button display portions 28a for navigation function selection are displayed at 8 points on edge portions of the map screen 28. These button display portions 28a correspond to the positions of the protruding brackets 4b and 4c among the protruding brackets 4 that exist at 8 points on both sides of the input pad 3, and blind operation of the button display portions 28a is possible by using the protruding brackets 4b and 4c.

When the driver performs a touch operation of the button display portion 28a by a blind operation with respect to the input pad 3 of the touch operation information output apparatus 1 and press-operates the input pad 3, the display device 2 executes the display operation corresponding to the selected button display portion 28a.

According to the above-mentioned structure, since the protruding brackets 4a–4c are formed on the input pad 3 of the touch operation information output apparatus 1, the touch operation position with respect to the input pad 3 can be recognized by touching the protruded brackets 4a–4c by a finger. Accordingly, unlike the input pad 3 which has a planar surface, the driver can perform a blind operation with respect to the touch operation information output apparatus 1.

In this case, since the protruding brackets have different shapes depending on their respective positions on the input pad 3, the touch operation position on the input pad 3 can be directly recognized, and blind operation with respect to the touch operation information output apparatus 1 can be speedily performed.

The present invention is not limited to the above-mentioned embodiment, but it can be modified and expanded.

Figure 9:
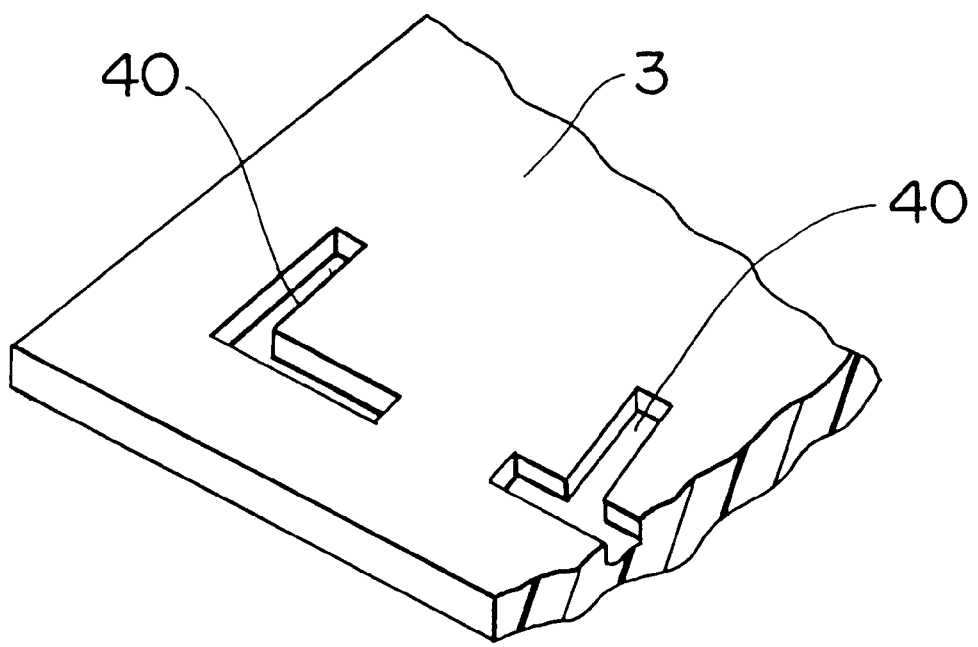
FIG. 9 is a perspective view partially cut away showing concavities formed in an output pad.

It is also acceptable to form concave portions or concavities 40 (FIG. 9) in the input pad 3 instead of the protruding brackets 4a–4c that are formed on the input pad 3 of the touch operation information output apparatus 1.

It is also acceptable to use a static method or a method of using a transparent conductive film as means for detecting the touched position with respect to the input pad 3 of the touch operation information output apparatus 1.

As clarified from the above explanation, according to the touch operation information output of the present invention, since bumps are provided at specified positions on the operating surface with different shapes corresponding to their respective positions on the aforementioned operating surface, the present invention has an excellent effect such that the user can recognize the touch operation with respect to the operating surface.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. A touch operation information output apparatus that outputs coordinate data showing a finger-touched position on an operating surface, comprising:

a plurality of surface variations provided at specified positions on said operating surface to define a particular area on the operating surface, the surface variations having different shapes corresponding to their positions on said operating surface.

2. A tactile surface panel apparatus for a touch operation information output device operably connected to a remote display screen, the display screen having button display portions, the tactile surface panel apparatus and the display screen being arranged respectively in different directions from an operator, the tactile surface panel apparatus comprising:

a substantially flat panel member having a plurality of tactile sensing elements disposed thereon, each one of the plurality of tactile sensing elements having different shape being disposed on the flat panel member in a manner to correspond to a button display portion on the remote display screen, each tactile sensing element having a surface configuration that identifies its relative position on the substantially flat panel member.

3. A tactile surface panel apparatus according to claim 2, wherein each one of the plurality of tactile sensing elements is a protuberance.

4. A tactile surface panel apparatus according to claim 3, wherein the protuberances have identifiable shapes based upon position on the flat panel member.

5. A tactile surface panel apparatus according to claim 2, wherein at least two of the plurality of tactile sensing elements have different configurations.

6. A tactile surface panel apparatus according to claim 5, wherein the different configurations are at least two of a cross-shape configuration, an L-shaped configuration and a T-shaped configuration.

7. A tactile surface panel apparatus according to claim 2, wherein each one of the plurality of tactile sensing elements is a concavity.

8. The touch operation information output apparatus of claim 1, wherein the specified positions of the surface variations correspond to respective positions on a remote display screen.

9. The touch operation information output apparatus of claim 1, wherein each surface variation has a shape that is determined based on the surface variation's position on the operating surface.

10. The touch operation information output apparatus of claim 1, wherein the output apparatus is an interface between an operator and at least one of a display, a navigation system, a radio, a climate control system and a climate control component.

11. The touch operation information output apparatus of claim 1, wherein the output apparatus outputs visual coordinate data showing a finger-touched position on the operating surface.

12. The tactile surface panel apparatus of claim 2, wherein the tactile surface panel apparatus is disposed at an armrest of a vehicle, and the display screen is disposed at a dashboard of the vehicle.

\* \* \* \* \*